(12) United States Patent
Manning et al.

(10) Patent No.: US 8,317,978 B1
(45) Date of Patent: Nov. 27, 2012

(54) NITRIDING OF CARBON NANOTUBES

(76) Inventors: Thelma G. Manning, Montville, NJ (US); Zafar Iqbal, Morristown, NJ (US)

(*) Notice: Subject to any disclaimer, the term of this patent is extended or adjusted under 35 U.S.C. 154(b) by 0 days.

(21) Appl. No.: 13/080,867

(22) Filed: Apr. 6, 2011

Related U.S. Application Data

(60) Provisional application No. 61/321,584, filed on Apr. 7, 2010.

(51) Int. Cl.
*B82B 3/00* (2006.01)
*D01F 9/12* (2006.01)
*B32B 9/00* (2006.01)
*B05D 5/12* (2006.01)
*D21H 13/50* (2006.01)
*D21H 27/00* (2006.01)

(52) U.S. Cl. ........ 162/152; 162/100; 162/103; 162/106; 210/660; 264/101; 264/109; 427/443.2; 427/446; 205/352; 423/447.1; 977/742; 977/749; 977/751; 977/752; 977/890; 977/892; 977/899

(58) Field of Classification Search .............. 162/100, 162/103, 106, 152; 427/122, 443.2, 446, 427/532–535, 569–570, 902, 906; 252/500, 252/502; 423/447.1–447.3; 205/431–432, 205/80–81, 352; 210/660, 665; 264/101, 264/109; 977/734–735, 742, 749, 750, 752, 977/755, 842, 847, 890–892, 899; 428/367, 428/408

See application file for complete search history.

(56) References Cited

U.S. PATENT DOCUMENTS

| | | | | |
|---|---|---|---|---|
| 6,479,030 | B1* | 11/2002 | Firsich | 423/447.1 |
| 6,572,997 | B1* | 6/2003 | Iqbal et al. | 429/518 |
| 6,824,689 | B2* | 11/2004 | Aardahl et al. | 210/660 |
| 7,754,054 | B2* | 7/2010 | Mitra et al. | 204/157.15 |
| 7,754,881 | B2* | 7/2010 | Lee et al. | 546/37 |
| 7,931,838 | B2* | 4/2011 | Marand et al. | 264/101 |
| 7,964,143 | B2* | 6/2011 | Farrow et al. | 422/68.1 |
| 2003/0148086 | A1* | 8/2003 | Pfefferle et al. | 428/293.7 |
| 2004/0007528 | A1* | 1/2004 | Bakajin et al. | 210/650 |
| 2004/0138733 | A1* | 7/2004 | Weber et al. | 623/1.11 |
| 2005/0074613 | A1* | 4/2005 | Tour et al. | 428/408 |
| 2005/0207963 | A1* | 9/2005 | Tour et al. | 423/447.1 |
| 2007/0243124 | A1* | 10/2007 | Baughman et al. | 423/447.1 |
| 2008/0170982 | A1* | 7/2008 | Zhang et al. | 423/447.3 |
| 2009/0087493 | A1* | 4/2009 | Dai et al. | 424/490 |
| 2009/0246625 | A1* | 10/2009 | Lu | 429/207 |
| 2009/0301896 | A1* | 12/2009 | Tour et al. | 205/432 |
| 2010/0143718 | A1* | 6/2010 | Smalley et al. | 428/376 |
| 2010/0152326 | A1* | 6/2010 | Kurz | 523/339 |
| 2010/0159127 | A1* | 6/2010 | Lin et al. | 427/122 |
| 2010/0279179 | A1* | 11/2010 | Farrow et al. | 429/401 |
| 2010/0297449 | A1* | 11/2010 | Kitano et al. | 428/408 |
| 2010/0301734 | A1* | 12/2010 | Suh et al. | 313/310 |
| 2010/0304215 | A1* | 12/2010 | Suh et al. | 429/209 |
| 2010/0326813 | A1* | 12/2010 | Mitra et al. | 204/157.43 |
| 2011/0086176 | A1* | 4/2011 | Yoon et al. | 427/443.2 |
| 2011/0184196 | A1* | 7/2011 | Chidsey et al. | 552/8 |
| 2011/0227002 | A1* | 9/2011 | Lee et al. | 252/510 |
| 2011/0240480 | A1* | 10/2011 | Farrow et al. | 205/109 |
| 2011/0248401 | A1* | 10/2011 | Hellstrom et al. | 257/741 |
| 2011/0281034 | A1* | 11/2011 | Lee et al. | 427/294 |
| 2011/0281070 | A1* | 11/2011 | Mittal et al. | 428/142 |
| 2012/0132380 | A1* | 5/2012 | Hentze et al. | 162/141 |
| 2012/0156124 | A1* | 6/2012 | Goyal et al. | 423/447.3 |
| 2012/0171103 | A1* | 7/2012 | Zhao et al. | 423/415.1 |

FOREIGN PATENT DOCUMENTS

| | | | |
|---|---|---|---|
| WO | WO 2006099392 A2 * | 9/2006 | |
| WO | WO 2007050460 A2 * | 5/2007 | |
| WO | WO 2008066683 A2 * | 6/2008 | |

OTHER PUBLICATIONS

BuckyPaper—Carbon Nanotube paper, Nano Lab, date unknow.*
Voher et al., "carbon nanotube sheets for use as artificial muscles," 2004, Carbon vol. 42 pp. 1159-1164.Cooper et al., "Gas permeability of a Buckypaper," 2003, Nono Letter, vol. 3, No. 2, pp. 189-192.*
Wang et al., "Highly oriented carbon nanotube papers made of aligned carbon nanotubes," 2008, Nanotechnology 19, pp. 1-6.*
Preparation of Buckypaper, 2006, NanoLab, pp. 1.*
Wang et al., "Processing and property investigation of single-walled carbon nanotube (SWNT) buckypaper/epoxy resin matrix nanocomposites," 2004, Composites: part A 35, pp. 1225-1232.*

* cited by examiner

*Primary Examiner* — Jose A Fortuna
(74) *Attorney, Agent, or Firm* — Henry S. Goldfine

(57) ABSTRACT

A method of fabricating a non-brittle, carbon nanopaper from single wall, multiwall, and combination thereof, from carbon nanotubes, using a vacuum deposition, high temperature annealing, and polystyrene polymer rinse process; which nanopaper can be nitrided by either a plasma-enhanced chemical vapor deposition (PECVD) process, or an by an electrochemical method, to obtain a useful chemically functionalized substrate, a substrate containing metastable $N_4$, $N_8$, and longer chain polymeric nitrogen clusters. Such nitrided carbon nanopaper can be used to enhance the ballistic performance of gun propellants, while reducing gun barrel wear and erosion thereof.

9 Claims, 2 Drawing Sheets

NITRIDING OF CARBON NANOTUBES

CROSS REFERENCE TO RELATED APPLICATION

This application claims the benefit of U.S. Provisional Patent Application 61/321,584 filed Apr. 7, 2010 the entire file wrapper contents of which provisional application are incorporated herein, as if set forth in its complete length.

FEDERAL INTEREST STATEMENT

The inventions described herein may be manufactured, used and licensed by the United States Government for United States Government purposes without payment of any royalties thereon or therefore.

FIELD OF THE INVENTION

This invention relates generally to a method of significantly increasing certain propellants burn rates, by adding thereto a nanopaper formed of carbon nanotubes, which nanotubes have been chemically functionalized by adding to the inner and outer sidewalls thereof polymeric nitrogen.

BACKGROUND OF THE INVENTION

State of the art propellant formulations and plastic bonded explosive compositions, at their most basic level, are composed of an oxidizer and a fuel. The composition reaction undergone by these two materials provides the energy necessary to propel the rocket, missile, shell, or bullet. Since the oxidizer fuel combination must sustain the stresses of handling, aging, storage, and use—under an extreme range of conditions, it is typically compounded in a formula consisting of a binder, plasticizer, and various solid ingredients. Ideally, all of the components in the formulation act as either oxidizers or fuels, contributing to the energy necessary for maximum propulsion performance; although in practice, certain necessary ingredients such as stabilizers and burn rate catalysts/modifiers, have little or no energy to impart to the reaction.

The performance of the propellant is directly proportional to the enthalpy release of the oxidizer and fuel ingredients as they undergo combustion, and inversely proportional to the molecular weight of the gases produced in the combustion reaction. In practice, some tradeoffs are necessary to gain the best performance from available ingredients and formulations. Aluminum, for instance, is a fuel whose combustion products are relatively high in molecular weight, and are in most cases, not gases at all, but solids. However, the enthalpy release by the combustion of aluminum is so great in proportion to anything else, which would otherwise be available as a fuel ingredient, that the metal is commonly used as a fuel in high-performance tactical and strategic rocket motor applications. Another material commonly utilized, despite some drawbacks, is the oxidizer ammonium perchlorate. This material has a high negative enthalpy of formation, limiting its energy release upon combustion, and, in addition, it produces hydrogen chloride upon combustion, a relatively high-molecular-weight toxic gas. However, ammonium perchlorate is inexpensive, easy to formulate, has very tractable ballistics and favorable burn characteristics, and so, despite its limitations, it is the state-of-the-art oxidizer for most solid propellant rocket motor formulations.

The addition of nano-sized particles as an energetic ingredient in propellant formulations, because of their small size and high surface area-to-volume ratio enables the propellant to achieve higher burning rates and impetus. Theoretically, an advantage of using aluminum particles in nano-dimensions is that they have a short ignition delay and combustion time. If the particles burn close to the propellant surface, the heat feedback rate into the propellant surface can be increased, causing an increase in the overall burn rate. However, the addition of nano-sized aluminum particles to fast burning HE (high-energy) propellants, e.g. RDX or CL-20 based propellants, did not modify the burn rate as expected. An article by Manning, et al, *Effects of Nano-sized Energetic Ingredients in High Performance Solid Gun Propellants*, available at the Defense Technical Information Center, Ft. Belvoir, Va., on line at: "www.dtic.mil/cgi-bin/GetTRDoc?Location=U2&doc=GetTRDoc.pdf&AD=ADA481943 May, 2008", discloses that the addition of nano-sized aluminum particles to an HE formulation slightly decreased the propellant burn rate at pressures below 41.4 MPa, while exhibiting almost no effect on the burn rate above this pressure.

The Manning article further stated that the addition of nano-sized boron to HE propellant formulations produced the same lack of effect as did the addition of nano-sized aluminum particles. Whereas prior to the experimentation, one would have logically thought that nano-sized boron particles would enhance the burn rate of any HE propellant—considering that boron has the highest volumetric heat of oxidation of all common fuels, $137.45$ kJ/cm$^3$, a high gravimetric heat of oxidation, $58.74$ kJ/gm, and a density of $2.34$ gm/cm$^3$, which is much lower than aluminum and should have increased the mass burning rate of the propellant.

Kuhl et al, *Detonation of Metastable Clusters*, 39$^{th}$ ICT Conference on Energetic Materials, June 2008, reported that polymeric nitrogen can accumulate 4 ev/atom in its N8 face-centered-cube gauche (FCC) structure, releasing energy by cluster fission: N8→4N2. Kuhl studied the locus of states in thermodynamic state space for the detonation of such a metastable polymeric nitrogen. In particular, the equilibrium isentrope, starting at the Chapman-Jouguet state, and expanding down to 1 atmosphere was calculated with the Cheetah code. Large detonation pressures (3 Mbar), temperatures (12 kilo-K) and velocities (20 km/s) are a consequence of the large heat of detonation (6.6 kilo-cal/g) for such a nitrogen cluster-based polymer. Kuhl concluded that if such metastable nitrogen cluster-based polymer could be synthesized, it would offer the potential for large increases in the energy density of materials.

Therefore there is a need in the art for a nitrided nano-sized particle that can be added to propellants to enhance the burn rates thereof, particularly such a particle incorporating a synthesized metastable nitrogen cluster based polymer that will add very significant energy upon detonation thereof.

SUMMARY OF THE INVENTION

To fulfill the above detailed need, there is provided by the present invention a method for synthesizing and chemically functionalizing metastable $N_4$, $N_g$ and longer chain polymeric nitrogen clusters, e.g. $N_{20}$, on carbon nanotubes; including, on the inner and outer sidewalls of carbon single wall nanotubes ("SWNT"), on the various wall surfaces of multiwall carbon nanotubes ("MWNT"), and preferably on mixtures thereof—which nanotubes are first formed into sheets of non-brittle nanopaper, to provide a usable substrate for the nitriding process. Such nitrided carbon nanotubes have been shown to exhibit an endothermic onset at 300 degrees Centigrade, similar to that experimentally shown by Wang et al., *Nanoscale Energetics with Carbon Nanotubes*, Mat. Res. Soc. Symp. Proc., 800, 351 (2004), with respect to nitrided carbon nanotubes. The continued reaction of nanotubes nitrided by the synthesis of the present invention, led to a rapid exothermic onset at 350 degrees Centigrade, similar to what is typically seen in an energetic material like cyclotetramethylene-tetramitramine (also known as HMX). Further, similar results were also obtained using Raman spectroscopy, SEM, laser ablation mass spectrometry, DSC and FTIR-ATR. Use of such nitrided carbon nanotubes should improve the ballistic performance of gun propellants by making it easier to achieve the desirable burn rate differential of 3:1 between the fast and slow propellants in fast core configurations. Further, the polymeric nitrogen in the propellant formulation, should increase gun propellant performance by lowering the $CO/CO_2$ ratio of the combustion gases, and further still, should reduce gun barrel wear and erosion by increasing the $N_2/CO$ ratio of these same combustion gases.

The present inventive process for nitriding carbon nanopaper comprises first forming a handlable, i.e. relatively nonbrittle and flexible, carbon nanopaper from commercially available, i.e. bulk, carbon nanotube particles—direct nitriding of such individual carbon nanotubes being impractical with today's technology—the resulting nanopaper being nitridable by either a plasma enhanced chemical vapor deposition method (PECVD), or by an electrochemical deposition method under ultraviolet irradiation. The nanopaper is formed by first preparing a uniform dispersion of carbon nanotube particles, in deionized (DI) water containing a small quantity of a surfactant, which mixture is subjected to an ultrasonic horn sonicator to obtain a uniform dispersion, i.e. a suspension, of the carbon nanotube particles, which suspension is vacuum filtered through a micron sized membrane until a bed of from about 0.5 to about 1 mm in thickness is obtained; then annealed under flowing ammonia or nitrogen, preferably ammonia, at about 800 to about 1000 degrees C., for about 1 hour; and then rinsed with a 1 to 5 weight solution of polystyrene polymer in an organic solvent, such as toluene. The rinsed sheets were then dried under ambient conditions until fully dry—about 6 to 8 hours—and peeled off the filtration membrane—providing a handlable free-standing sheet of nanopaper consisting entirely of carbon nanotube bundles, the nanopaper sheet being from about 0.3 to about 1 mm in thickness.

According to the present invention, the nanopaper can be nitrided using a plasma-enhanced chemical vapor deposition (PECVD) method, wherein a length of carbon nanopaper substrate is placed in a temperature controlled, gas flow through furnace, heated from about 150 to about 200 degrees C., and a radio frequency (rf) energy source, about 50 to about 70 watts of power, excites a nitrogen-hydrogen gas stream, or nitrogen-argon gas stream; which stream is passed over the nanopaper substrate at a rate of about 25 to about 50 standard cubic centimeters per minute, at a pressure of about 1 to about 1.4 Torr, for a period of about 1 hour. Preferably, the nitrogen-hydrogen or nitrogen-argon mixture is about 25% to about 50% nitrogen to about 75% to about 50% hydrogen or argon—most preferably, the nitrogen-hydrogen mixture is used, and the ratio is about 50% nitrogen to 50% hydrogen. The nitrogen gas provides the chemically functionalized metastable $N_4$, $N_8$ and longer chain polymeric nitrogen clusters that will then deposit on, i.e. nitride, the carbon nanopaper substrate.

Alternatively, according to the present invention, the carbon nanotube nanopaper substrate can be nitrided in an electrolytic cell, wherein the carbon nanotube nanopaper is suspended within the electrolytic cell as the working electrode, the cell containing an about 1 to about 2 molar, preferably about 1M, aqueous (preferably DI water) solution of sodium azide ($NaN_3$), to provide an electrolyte at pH equal to about 4. Also, suspended in the cell are a platinum foil counter electrode, and a saturated calomel electrode, as a reference electrode. A computer controlled standard cyclic voltammetric potentiostat-galvanostat can be used to monitor the oxidation-reduction reaction in the cell and will indicate the endpoint of the ion flow—which should be within from about 30 minutes to about 1 hour.

The nature of the subject invention will be more clearly understood by reference to the following detailed description and the appended claims.

BRIEF DESCRIPTION OF THE DRAWINGS

Further features and advantages of the present invention may be understood from the drawings in which.

DETAILED DESCRIPTION

Figure 1:
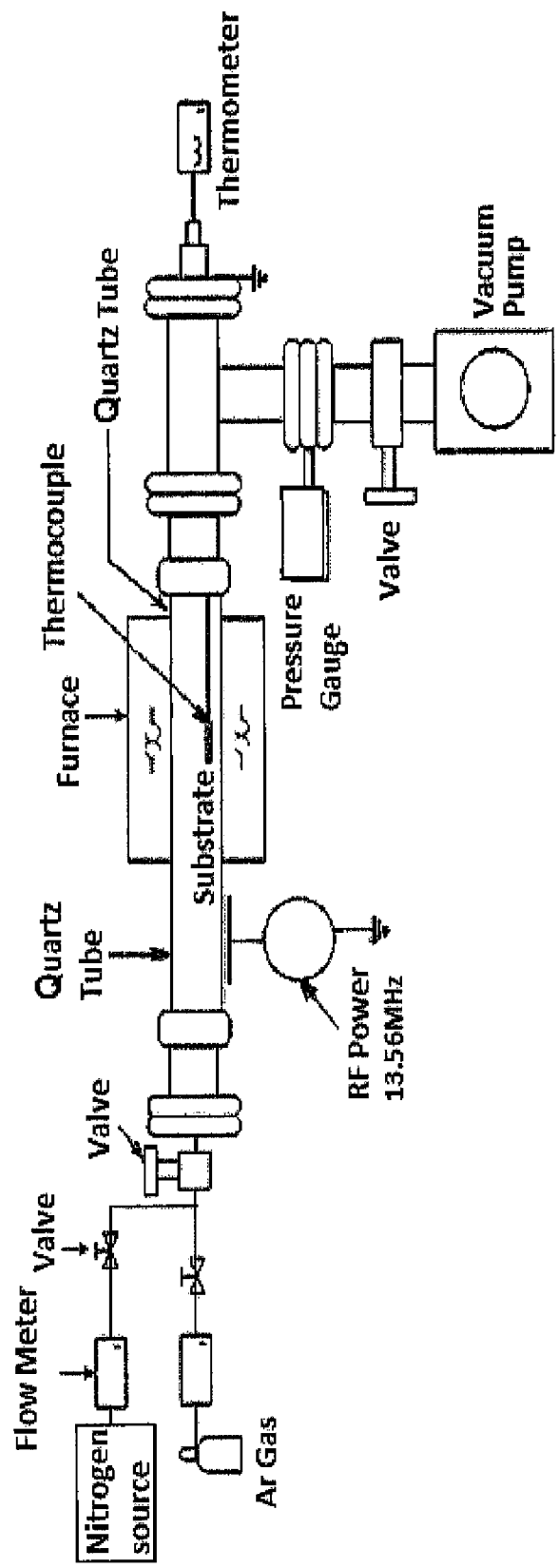
FIG. 1 is a schematic of the plasma-enhanced chemical vapor deposition process used in the present invention to obtain nitrided carbon nanopaper.

The present invention provides a method for nitriding carbon nanotubes by synthesizing and chemically functionalizing metastable $N_4$, $N_8$, and longer chain nitrogen polymeric clusters on SWNT, MWNT, and combinations thereof on non-brittle nanopaper formed of the carbon nanotubes. The method requires high quality, impurity free, carbon nanotube particles, which particles are initially formed into nanotube sheets, referred to as Buckypaper, or nanopaper, which carbon nanotube nanopaper sheets provide a substrate which can more effectively manipulated during the required nitriding processes, and subsequently can be easily converted back to particle size and added to propellant formulations.

Pursuant to the present invention, the nanopaper is formed by first preparing a uniform dispersion of SWNT, MWNT, and/or a combination thereof, in deionized (DI) water, which dispersion process is added a small quantity, i.e. about 1% by weight, of a surfactant, for example, a nonionic surfactant such as Triton X100™ available from Sigma-Aldrich, St. Louis, Mo. or an anionic surfactant such as sodium dodecyl sulfate will also function well, in fact, most common nonionic, anionic, or cationic surfactants will function equally well—to reduce the surface tension of the water, thereby allowing the nanocarbon particles to be wetted, and thereby allowing the particles to go into dispersion or suspension more easily. To provide the required uniform dispersion, i.e. suspension, after adding the carbon nanotubes, and small quantity of surfactant, to the DI water, the mixture was subjected for from about 15 to about 60 minutes, preferably for from about 15 to about 30 minutes, to an ultrasonic horn sonicator (Fisher Scientific Sonicator 3000), at 300 W, to achieve the desired dispersion. The now uniform suspension, was vacuum filtered, at about 0.2 atm pressure, through a micron sized membrane, preferably, through a Fluoropore™ Mitex™ membrane, a hydrophobic PTFE membrane bonded to a high density polyethylene support filter, available from Millipore, Billerica, Mass., which has a 10 µm pore size and is 25 mm in diameter—though, generally, about 0.5 to about 10 micron pore sized Teflon coated membranes should work equally well. The vacuum filtering process is continued until a bed or layer of nanocarbon particles of from about 0.5 to about 1 mm is deposited on the membrane.

The vacuum filtered carbon nanopaper sheets, were then annealed under flowing ammonia or nitrogen, preferably ammonia, at about 800 to about 1000 degrees C., for about 1 hour—to burn off any residual surfactant, or other contaminants (such as small amounts of metal catalyst found to be present in the carbon SWNT provided by Cheap Tubes Inc.). Prior experiments of annealing the filtered nanopaper sheets with ammonia mixed with argon at 500 degrees C. for 30 minutes were not successful—the resulting nanopaper was much too brittle. Regardless, it is believed, that the annealing is crucial to removal of any surface impurities on the carbon nanopaper, to improve the bonding of the nitrogen thereto, in the subsequent nitration steps and to avoid the potential for an explosion due to an impurity. The subject annealing process, with the specified environment (i.e. ammonia or nitrogen atmosphere) and elevated temperature conditions can be done using atmospheric pressure chemical vapor deposition (APCVD) equipment, such as is available commercially from CVD Equipment Corporation, Ronkonkoma, N.Y.

To provide the necessary structural functionality the annealed carbon nanopaper of the present inventive process, was reinforced by simply rinsing the annealed material with a 1 to 5 weight percent solution of polystyrene polymer in a solvent, preferably an organic solvent, and most preferably toluene. The rinsed sheets were then dried under ambient conditions until fully dry—about 6 to 8 hours—and peeled off the filtration membrane—providing a free-standing sheet of nanopaper consisting entirely of carbon nanotube bundles. This rinse resulted in carbon nanopaper sheets that displayed significant improvements in Young's modulus and tensile strength—such that the resulting carbon nanopaper was functional for the subsequent required processing.

SWNT particles are most preferred in the present invention due to the fiber length of each tube and the resulting flexibility of the nanopaper produced. Particular, high quality, impurity free, carbon SWNT particles useful in the present invention can be obtained from Southwest Nanotechnologies Inc., Norman, Okla.; or from Cheap Tubes Inc., Brattleboro, Vt., the importance of having impurity free carbon nanotubes is to avoid the potential of an impurity causing an unforeseen reaction and detonation during the inventive nitriding process. The Southwest Nanotechnologies Inc. carbon SWNTs have an outer diameter of 1.12 nm and an average fiber length of about 1.02 μm. Whereas, the Cheap Tubes Inc. carbon nanotubes have an outer diameter of 1 to 2 nm and an average fiber length of 5 to 30 μm—significantly longer than the carbon nanotubes from Southwest Nanotechnologies—however, this difference did not affect the quality of the nanopaper produced by the subject inventive method.

The MWNT particles are shorter than SWNT particles and the resulting nanopaper is not as flexible as that produced from SWNT particles and is more brittle. However, MWNT particles are less expensive and it has been found that using a combination of MWNT and SWNT particles produces an acceptable, non-brittle, flexible nanopaper that is less expensive than the pure SWNT nanopaper. Preferably, the ratio of MWNT to SWNT should be about a 3:1 wt/wt ratio. A source of acceptable, pure MWNT useful in the present invention is from Nanolab Inc., Waltham, Mass.

The present inventive method provides two alternative processes for nitriding of the carbon nanopaper, formed pursuant to the present inventive method, as detailed above. The first nitriding method, as illustrated in FIG. 1, utilizes a plasma-enhanced chemical vapor deposition (PECVD) method, wherein a carbon nanopaper substrate (the "substrate" shown in FIG. 1) is placed in a temperature controlled tube furnace, heated to from about 150 to about 200 degrees C., and a radio frequency (rf) energy source, about 50 to about 70 watts of power, excites a nitrogen-hydrogen gas stream (not shown in FIG. 1), or nitrogen-argon gas stream (shown in FIG. 1); which is passed over the nanopaper substrate at a rate of about 25 to about 50 standard cubic centimeters per minute, at a pressure of about 1 to about 1.4 Torr, for a period of about 1 hour. Preferably, the nitrogen-hydrogen or nitrogen-argon mixture is about 25% to about 50% nitrogen and to about 75% to about 50% hydrogen or argon—most preferably, the nitrogen-hydrogen mixture is used, and the ratio is about 50% nitrogen to 50% hydrogen. The nitrogen gas provides the chemically functionalized metastable $N_4$, $N_8$ and longer chain, e.g. $N_{20}$, polymeric nitrogen clusters that will then deposit on, i.e. nitride, the carbon nanopaper substrate. PECVD equipment useful in for the subject process is available commercially, such as from the First Nano Division of the CVD Equipment Corporation, Ronkonkoma, N.Y.

Figure 2:
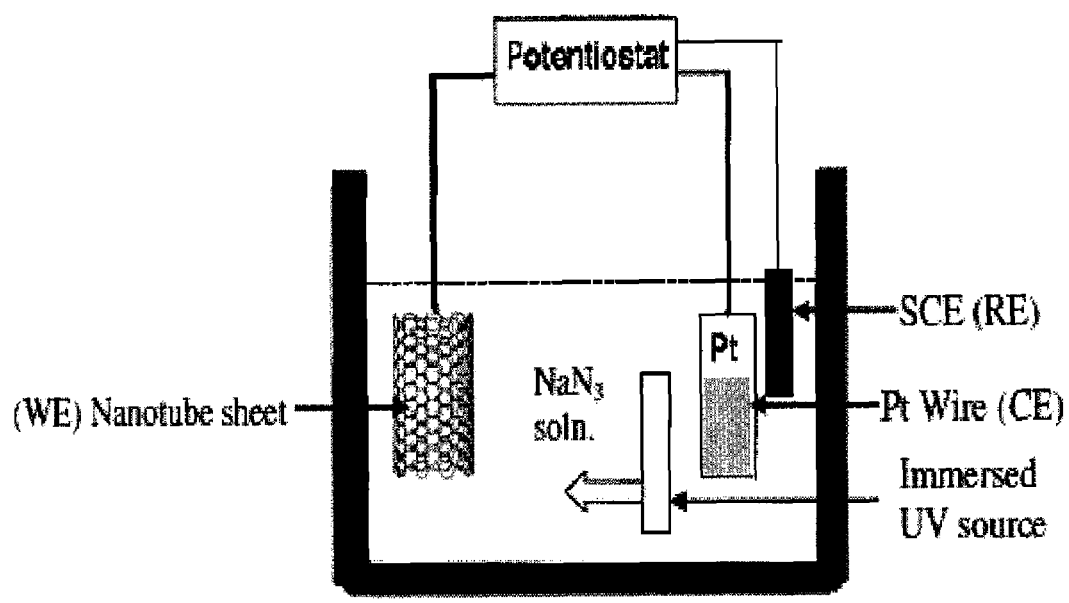
FIG. 2 is a schematic of a 3-electrode electrochemical cell deposition process used in the present invention to obtain nitrided carbon nanopaper.

The second method of depositing of the desired nitrogen groups onto the carbon nanotube nanopaper substrate according to the present invention, involves first preparing the carbon nanotube nanopaper, as detailed above, which nanopaper is used as the working electrode (WE) in an electrochemical nitriding process, as illustrated in FIG. 2. The nanopaper electrode is suspended in an electrolytic cell, containing a 1 to 2 molar, preferably 1 M, aqueous (preferably DI water) solution of sodium azide ($NaN_3$), to provide an electrolyte solution at pH equal to about 4. Also, suspended in the cell are a platinum foil, or platinum wire counter electrode (CE), and a saturated calomel electrode, as a reference electrode (RE). Computer controlled cyclic voltammetry data was collected using a computer controlled potentiostat-galvanostat such as available from Elchema, Potsdam, N.Y., during the electro-functionalization of the nanopaper working electrode with nitrogen, that occurs as per equation (1), immediately below:

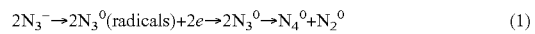

$$2N_3^- \rightarrow 2N_3^0 \text{(radicals)} + 2e \rightarrow 2N_3^0 \rightarrow N_4^0 + N_2^0 \quad (1)$$

The potentiostat-galvanostat will indicate the slowing of the ion flow and therefore the end-point in the electrochemical reaction—which should be within a period of from about 30 minutes to about 1 hour.

Within the subject reaction, $N_4^0$ and $N_2^0$ radicals will form via oxidation of $N_3^-$ ions and reduction will create radicals and further reduction will convert the radicals back to $N_3^-$ anions. If active sites are present on the nitrogen-doped carbon nanopaper and excess radicals are present in the solution, $N_4$ radicals will convert to $N_8$ clusters, and $N_2$ radicals will form $N_4$ and $N_8$ clusters, which clusters will be encapsulated on the carbon nanopaper sidewalls by covalent bonding between the carbon on the nanopaper sidewalls with the cluster nitrogen atoms. Oxidation reactions would then predominate and in-situ ultraviolet radiation applied will generate additional $N_3$ radicals to increase the production of $N_8$ clusters—per the process detailed above and in Equation 1.

The invention claimed is:
1. A process for forming and nitriding carbon nanopaper comprising:
   (a) adding carbon nanotube particles in an aqueous solution of 1 weight percent surfactant;
   (b) subjecting the aqueous solution to an ultrasonic horn sonicator until a uniform dispersion of the carbon nanotube particles is obtained within the aqueous solution;
   (c) vacuum filtering the aqueous solution through a micron sized membrane to obtain a coating of deposited carbon nanotube particles from about 0.5 to about 1 mm on the membrane;

(d) annealing the carbon nanotube coated membrane under flowing ammonia, at about 800 to about 1000 degrees C., for about 1 hour;
(e) rinsing the annealed carbon nanotube coated membrane with a 1 to 5 weight solution of polystyrene polymer in an organic solvent;
(f) drying the rinsed annealed carbon nanotube coated membrane under ambient conditions until fully dried;
(g) peeling off the filtration membrane as a carbon nanopaper;
(h) placing the carbon nanopaper in a temperature controlled, gas flow through furnace, heated to about 150 to about 200 degrees C.;
(i) subjecting a nitrogen-hydrogen gas mixture to an about 50 to about 70 watts of radio frequency energy to generate an excited nitrogen-hydrogen gas;
(j) passing the excited gas over the heated carbon nanopaper, located in the gas flow through furnace, at a rate of about 25 to about 50 standard cubic centimeters per minute, at a pressure of about 1 to about 1.4 Torr, for a period of about 1 hour;
(k) removing from the gas flow through furnace a chemically functionalized nitriding carbon nanopaper.

2. The process for forming and nitriding carbon nanopaper of claim 1, wherein the annealing of the carbon nanotube coated membrane is under flowing nitrogen gas.

3. The process for forming and nitriding carbon nanopaper of claim 1, wherein the gas passing over the carbon nanopaper is a nitrogen-argon gas plasma.

4. The process for forming and nitriding carbon nanopaper of claim 1, wherein the carbon nanotube particles are selected from a group consisting of single wall carbon nanotubes, multiwall carbon nanotubes, and a combination thereof.

5. The process for forming and nitriding carbon nanopaper of claim 4, wherein the carbon nanotube particles are a 3:1 wt/wt ratio of multiwall to single wall carbon nanotube particles.

6. A process for forming and nitriding carbon nanopaper comprising:
(a) adding carbon nanotube particles in an aqueous solution of 1 weight percent surfactant;
(b) subjecting the aqueous solution to an ultrasonic horn sonicator until a uniform dispersion of the carbon nanotube particles is obtained within the aqueous solution;
(c) vacuum filtering the aqueous solution through a micron sized membrane to obtain a coating of deposited carbon nanotube particles from about 0.5 to about 1 mm on the membrane;
(d) annealing the carbon nanotube coated membrane under flowing ammonia, at about 800 to about 1000 degrees C., for about 1 hour;
(e) rinsing the annealed carbon nanotube coated membrane with a 1 to 5 weight solution of polystyrene polymer in an organic solvent;
(f) drying the rinsed annealed carbon nanotube coated membrane under ambient conditions until fully dried;
(g) peeling off the filtration membrane as a carbon nanopaper;
(h) suspending the carbon nanopaper within an electrolytic cell as the working electrode; the cell containing an about 1 to about 2 molar aqueous solution of sodium azide to provide an electrolyte at pH equal to about 4;
(i) suspending in the electrolytic cell are a platinum foil counter electrode, and a saturated calomel electrode, as a reference electrode;
(l) using a computer controlled standard cyclic voltammetric potentiostat-galvanostat to monitor the oxidation-reduction reaction in the cell to indicate the end-point of the ion flow; whereupon, the carbon nanopaper will be fully nitrided.

7. The process for forming and nitriding carbon nanopaper of claim 6, wherein there is an immersed UV source within the electrolytic cell.

8. The process for forming and nitriding carbon nanopaper of claim 6, wherein the carbon nanotube particles are selected from a group consisting of single wall carbon nanotubes, multiwall carbon nanotubes, and a combination thereof.

9. The process for forming and nitriding carbon nanopaper of claim 8, wherein the carbon nanotube particles are a 3:1 wt/wt ratio of multiwall to single wall carbon nanotube particles.

* * * * *